G. W. RICE.
REVERSIBLE IRRIGATION BOX.
APPLICATION FILED OCT. 17, 1916.
1,283,904.
Patented Nov. 5, 1918.
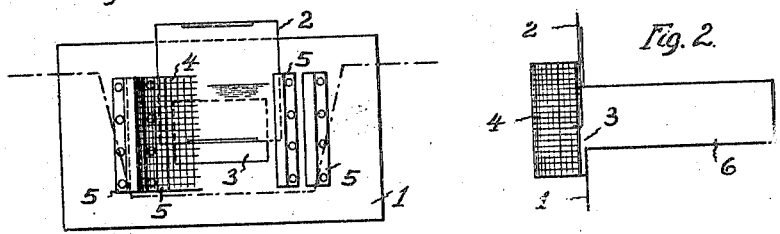
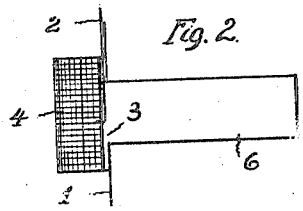
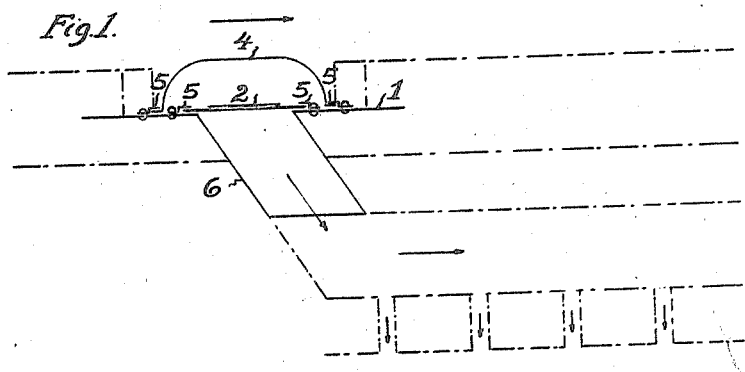
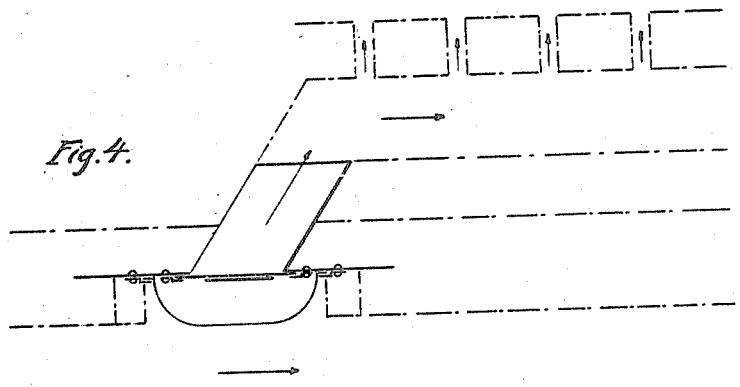

UNITED STATES PATENT OFFICE.

GEORGE W. RICE, OF TWIN FALLS, IDAHO.

REVERSIBLE IRRIGATION-BOX.

1,283,904.

Specification of Letters Patent.

Patented Nov. 5, 1918.

Application filed October 17, 1916. Serial No. 126,221.

*To all whom it may concern:*

Be it known that I, GEORGE W. RICE, a citizen of the United States, residing at Twin Falls, in the county of Twin Falls, and in the State of Idaho, have invented a new and useful Reversible Irrigation-Box, of which the following is a specification.

My invention relates to improvements in irrigation boxes for taking water out of an irrigation ditch, and to control the volume as required. The irrigation box is a short metallic box or square tube with a flat metallic face, and with an opening in the center; the metallic face projects outward at each end and upward and downward on the side, and has a door or lid to slide and move upward and downward to control the volume of water out of the ditch as required. The box face has an adjustable wire screen to keep rubbish from stopping up the box. By cutting a hole through the ditch bank one may be able to force the wings or face of this box in the banks of the ditch, and forcing the projection or lower side of box face into the earth in the bottom of the opening. When so applied to the ditch bank the box is ready for use. This box is so constructed that it is reversible, and when reversed, which is done by turning bottom side up, it then can be used upon the opposite side of a ditch, and when reversed it is an exact duplicate in all the work to be performed. These boxes may be made in sizes as required and light enough to enable one to carry them with them instead of putting in permanent boxes. I attain these objects by the mechanism illustrated in the accompanying drawings.

In which Figure 1 is a top view of the entire box.

Fig. 2 is a side view of box.

Fig. 3 is a front view of box.

Fig. 4 is a reversed view of Fig. 1, and when reversed can be used upon the opposite side of a ditch, and when reversed is an exact duplicate in all the work to be performed.

Fig. 1 represents a short metallic self adjustable irrigation box as shown in opening in a ditch bank for use, to control the water out of ditch and into a feed ditch for final distribution out and on the land. 1 in Figs. 1, 2 and 3 represents face of box.

2 in Figs. 1, 2 and 3 is a sliding gate or lid to adjust the volume of water as required. 3 in Figs. 2 and 3 is an opening in the box face and is for the purpose of letting the water pass into and through the box. 4 in Figs. 1, 2 and 3 represents an adjustable wire screen, and for the purpose of keeping weeds or other rubbish from stopping up the opening in box.

5 in Figs. 1 and 3 represents two sets of irons with offsets or flanges and are fastened to box face 1, to hold the sliding lid and adjustable wire screen and to permit them to slide up and down as required.

6 in Figs. 1 and 2 represents a short metallic box attached to box face 1.

The dash and dotted lines in Figs. 1 and 3 represent a ditch bank and opening in ditch bank and shows manner of applying box to ditch.

The arrows indicate the flow of water to feed ditch for final distribution to and on the land.

Fig. 4 represents the box as reversed to be used on the opposite side of a ditch, and when reversed is an exact duplicate in all the work to be performed.

I claim:

1. In an irrigation box in combination, an outlet box, a face plate attached to one end of the box at a lateral angle, and provided with an opening, gate receiving channels upon said face plate, upon each side of said opening open at top and bottom, screen receiving channels upon said face plate upon each side of said gate receiving channels, said face plate projecting above and below said box whereby the device may be reversed and used in either bank of a waterway.

2. In an irrigation box in combination, an outlet box, a face plate at one end of the box and at a lateral angle thereto, said face plate having an opening communicating with the outlet box, gate receiving means associated with said face plate upon each side of said opening, screen receiving means associated with said face plate upon each side of said gate receiving means, said face plate projecting above and below said box whereby the device may be reversed and used in either bank of a waterway.

3. In an irrigation box, in combination an outlet box, a face plate attached to one end of the box at a lateral angle and provided with an opening, guide means upon the face plate at each side of said opening, said guide means adapted to receive and retain the vertical edges of the vertical gate and a curved screen at one and the same time.

4. In an irrigation box, in combination, an outlet box, a face plate attached to one end of the box at a lateral angle and provided with an opening, receiving channels at each side of said opening open at the top and bottom, a flat gate and curved screen mounted and held in said receiving channels at their vertical edges.

GEORGE W. RICE.

Copies of this patent may be obtained for five cents each, by addressing the "Commissioner of Patents, Washington, D. C."